UNITED STATES PATENT OFFICE.

HENRY PEMBERTON, OF PHILADELPHIA, PENNSYLVANIA.

MANUFACTURE OF BICHROMATES.

SPECIFICATION forming part of Letters Patent No. 234,145, dated November 9, 1880.

Application filed July 1, 1880. (No specimens.)

*To all whom it may concern:*

Be it known that I, HENRY PEMBERTON, of the city and county of Philadelphia, in the State of Pennsylvania, have invented a new and useful Improvement in the Manufacture of Bichromate of Potassa and other Chromates; and I do declare the following to be a full, clear, and exact description thereof.

My invention consists of an improved method of converting the insoluble compounds of chromic acid formed during the treatment of mixtures of chrome ore and earthy and alkaline bases and salts into the soluble chromates of the said bases.

The ordinary method of making bichromate of potassa and other chromates consists in calcining chrome ore in an oxidizing atmosphere with hydrate or carbonate of lime and the hydrates or salts of potassa or soda, and then digesting the calcined mass in water, with such additional amounts of the said salts of the alkalies as may be necessary to decompose any chromate of lime or magnesia that may be present into chromates of the alkaline bases. In the manufacture of bichromate of potassa sufficient sulphuric or other acid is then added to the clear solution of the neutral chromate of potassa resulting from the above digesting process to withdraw one-half of the potassa from combination with the chromic acid, forming bichromate of potassa and an equivalent amount of a potassic salt of the acid used. The respective salts are then separated by crystallization and the bichromate recrystallized until pure. This process, being well known and fully described in many technical works, need not be herein further described in detail.

In the above process, however, it may be varied, and especially when working the chrome ores from California a serious waste of chromic acid has always occurred, the avoidance of which is the subject of my invention. This waste is caused as follows: After digesting the calcined mass, as above described, with water, the greater portion of the chromates present dissolves, as alkaline chromates, and is separated by lixiviating the mass; but a considerable quantity thereof, varying from ten to twenty per cent. of the total amount of chromic acid formed, obstinately resists solution, being in the state of a complex combination of chromic acid, oxide of iron, alumina, and lime, and this, as it will not dissolve in or be decomposed by the salts of the alkalies, is usually lost. If, however, dilute sulphuric acid be added, either to the mixture or to the residuum after the clear solution is drawn off, in proper quantity, the compound will be decomposed, sulphate of lime or sulphates of the other bases present will be formed, and the entire quantity of the existing chromic acid may be obtained as an alkaline chromate. This use of sulphuric acid has several objections: It is not commercially practicable, because, in order to fully liberate the chromic acid from its insoluble combinations, sulphuric acid must be added in sufficient quantity to saturate all the bases present, and as the mixture contains lime alone in quantity much exceeding the weight of the chrome ore used, the cost of the sulphuric acid required would exceed that of the chrome ore, rendering it much cheaper to lose the chromate than to use the sulphuric acid. A further objection exists in the probable formation of soluble sulphates of magnesia and alumina, which bases are often present in large amounts, especially in the California chrome ores, where they frequently constitute, respectively, fifteen and twenty per cent. thereof, and the presence of such bases in solution seriously complicates the separation and purification of the chromates.

I have discovered that the decomposition of the above-described insoluble combination of chromates may be completely and satisfactorily effected by carbonic acid, and the total amount of chromic acid obtained in solution as alkaline chromates, notwithstanding the fact that chromic acid is usually a stronger acid than carbonic acid, the former, for instance, in the shape of bichromate of potassa, expelling carbonic acid from a solution of carbonate of potassa, forming the neutral chromate of potassa.

To enable others skilled in the art or science to make use of my improved process, I will proceed to describe it more fully.

The mixture of finely-powdered chrome ore, lime, and alkalies or alkaline salts, having been calcined as usual in an oxidizing-furnace, is mixed with the additional salts of the alkalies required and with water in sufficient quantity to form a thin cream and to hold in solution the theoretical amount of alkaline chromate. A little over a gallon of water to each pound of chrome ore used is generally sufficient. For this purpose I prefer to use a high cylindrical vessel of boiler-iron with a conical bottom, into which the mixture is charged. This vessel is such as is generally used in the purification of petroleum with sulphuric acid. I then force into the mixture, through pipes provided at their lower ends with numerous small holes, a current of gases containing carbonic acid, purified as hereinafter described, and obtained from the waste gases from furnaces burning anthracite coal, coke, or charcoal, or from the gases from limekilns, or from any other convenient source.

The mixture of calcined matters and water is kept violently agitated either by the permeating and escaping gases or by mechanical means if the action of the gases is insufficient, so as to hold the insoluble matter in a state of suspension in the fluid. This treatment is continued until the chromic acid present is all in solution, which can be readily determined by the usual chemical tests, or approximately by the color of the insoluble portion of the mixture, which, being at first a dark olive green, becomes by the action of the carbonic acid a light yellowish brown, or like the hydrated oxide of iron. The length of time required is, of course, dependent upon the rapidity of the passage of the gas and the amount thereof. In a proper apparatus it can easily be completed in twenty-four (24) hours.

The gas containing the carbonic acid must, of course, be washed and freed from all traces of sulphurous acid before using, which is readily done by passing it through washing or scrubbing towers or over or through wet carbonate of lime in mass or powder, or by other well-known means.

Any form of apparatus that will bring carbonic acid into contact with the mixture may be used, or the mass from the calcining-furnace may be exposed in its dry state or after being wetted to the action of carbonic acid; or the chromate formed and already soluble may be first leached out, and the residue alone, or with the additional salts of the alkalies, be mixed with water and subjected to the action of carbonic acid; but I prefer the method as first described.

The bicarbonates of the alkalies may be used instead of the carbonic acid and added to the aqueous mixture; but the bicarbonates are more expensive and less satisfactory in their action. I therefore prefer to use the carbonic-acid process, as herein set forth.

The decomposition of the insoluble chromates being completed, the solution is separated from the insoluble residuum, concentrated, and converted into bichromate of potassa or other chromates in the usual manner.

The residuum usually contains several per cent. of undecomposed chrome ore. The chromic acid equivalent thereto can be obtained as soluble chromate by leaving in or supplying to the residuum a little of the salts of the alkalies and drying and recalcining the mass, which being then treated with water and carbonic acid, as before, the theoretical amount of chromate corresponding to the oxide of chrome in the ore may be obtained.

The chief advantages of my improved process over those heretofore known and practiced in the manufacture of the salts of chromic acid are:

First, the obtainment of the total, or nearly total, amount of chromic acid equivalent to the oxide of chromium contained in the chrome ore.

Second, the economy of the process. The carbonic acid costs nothing for its production, since the fires under the steam-boilers for driving the grinding machinery, or even the calcining-furnaces themselves, will supply many times over the quantity needed. Very little power is required for driving the pumps or other apparatus forcing the carbonic-acid gases. The cost thereof is therefore insignificant.

Third, the purity of the product. The avoidance of the use of sulphuric acid and its consequent action upon the earthy bases present prevent the formation of any sulphates of magnesia, of alumina, or of iron, which, being soluble, would render more impure the resulting solutions, while, if any silica or alumina should enter solution as alkaline silicates or aluminates, they would be precipitated from solution in an insoluble form by the carbonic acid, thus leaving a nearly pure solution of the alkaline chromates only.

Having thus described my invention, what I claim as new, and desire to secure by Letters Patent, is—

As an improvement in the process of manufacturing bichromate of potassa and other chromates, the hereinbefore-described method of treating the calcined mixture of chrome ore, bases, and salts by passing carbonic-acid gas into the same, for the purposes described.

H. PEMBERTON.

Witnesses:
CHARLES F. ZIEGLER,
J. WALTER DOUGLASS.